Figure 1:
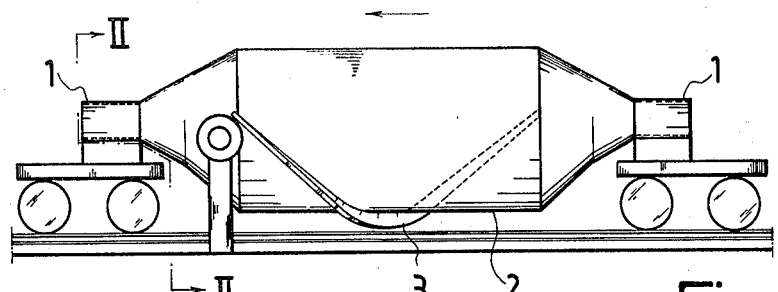

United States Patent [19]

Lönnroth

[11] 4,453,871
[45] Jun. 12, 1984

[54] GOODS WAGON UNLOADING MECHANISM

[76] Inventor: Aarne Lönnroth, Isokaari 9 b B 17, 00200 Helsinki 20, Finland

[21] Appl. No.: 350,156

[22] Filed: Feb. 19, 1982

[30] Foreign Application Priority Data

Mar. 20, 1981 [FI] Finland ................................ 810865

[51] Int. Cl.³ ............................................. B61D 7/12
[52] U.S. Cl. .................................... 414/384; 414/387; 105/241.2; 105/264; 105/268
[58] Field of Search ............... 414/382, 383, 384, 387; 105/241.1, 241.2, 264, 268

[56] References Cited

U.S. PATENT DOCUMENTS

| | | | |
|---|---|---|---|
| 1,893,633 | 1/1933 | Peterson et al. | 414/384 |
| 2,623,651 | 12/1952 | Vial | 414/384 |
| 3,358,858 | 12/1967 | Zabel, Jr. | 414/384 |
| 3,630,394 | 12/1971 | Kingzett | 414/384 |
| 3,838,650 | 10/1974 | Dutko et al. | 105/264 X |
| 4,089,404 | 5/1978 | Venzke | 414/384 X |
| 4,120,412 | 10/1978 | Miller et al. | 414/387 |

FOREIGN PATENT DOCUMENTS 2832598  1/1980  Fed. Rep. of Germany .

*Primary Examiner*—Leslie J. Paperner
*Assistant Examiner*—Ken Muncy

[57] ABSTRACT

An unloading mechanism for a goods wagon having a container with a cylindrical bottom and rotatably carried at its ends in bearings on bogies comprises an arcuate guide affixed to the container and extending on the underside around the cylindrical bottom of the container in a helical configuration and two rollers respectively rotatably carried on supports at different levels and disposed on opposite sides of a travelling path of the wagon As the wagon is moved to an unloading station the roller at the lower level comes into contact with the underside of the guide and forces the container to turn 180° into an inverted position. The container can then be forced to turn another 180° to a transport position by bringing the roller at the higher level into contact with the upper side of the guide.

3 Claims, 4 Drawing Figures

GOODS WAGON UNLOADING MECHANISM

The present invention concerns an unloading mechanism for a goods waggon (or car) used in railway or road transports having a goods container with cylindrical bottom mounted with its ends turnably by bearings on bogies, said unloading mechanism comprising an arcuate guide and a roller, one of these two being located on the goods container and the other on one side of the travelling path and both when they come into interaction causing the goods container to rotate about its longitudinal axis. Waggons of this type are usually employed to transport granular or powdery material.

An unloading mechanism of this kind is known in prior art for instance through the German reference DE-OS No. 28 32 598 and the U.S. Pat. No. 2,623,651. In these unloading mechanisms of prior art the arcuate guide is located beside the travelling path and the roller or sliding member on the goods container of the waggon. The guide has an ascending part, the roller or sliding member when moving along this forcing the goods container to tilt, whereby the loaded goods are given a chance to discharge from within the container. The guide has thereafter a descending portion, which forces the goods container back into its original position.

The unloading mechanisms of prior art are encumbered by the essential drawback that the tilting angle of the goods container is restricted. There is no guarantee that the goods will all be emptied from the container. This drawback is accentuated in the winter when the granules or lumps of wet goods freeze fast not only to each other but also to the container walls. In such a situation human labour is required, and this slows down the operation and increases the costs. Moreover, the risk of accident is imminent.

The object of the invention is to provide a new kind of unloading mechanism which is free of the drawbacks mentioned. The invention is characterized in that the guide wraps around the underside of the goods container's cylindrical part, extending in helical configuration from end to end thereof so that its initial and ultimate ends are located in the horizontal plane passing through the axis of the cylindrical part, and that with the guide two rollers can be made to interact which have been rotatably carried in supporting means disposed on opposite sides of the travelling path, whereby when the waggon is pulled into the unloading station the first roller at the initial end of this station is brought into contact with the underside of the guide, forcing as the waggon moves forward without stopping the goods container to turn in its bogie bearings through 180° about its longitudinal axis into inverted position, whereafter returning of the waggon into its transport position is accomplished with a second roller turnably carried on a supporting means and located on the opposite side of the travelling path on a higher level, and which when it comes into contact with the upper side of the guide forces the goods container to turn another 180° about its longitudinal axis.

It is thus understood that with the aid of the unloading mechanism of the invention the goods container is turned upside down, whereby it positively dumps all its contents. No embarrassments or interruptions of any kind are encountered in the operation.

According to an embodiment of the invention, both rollers may be located immediately at both ends of the unloading station. Another alternative is that the second roller is located immediately before the loading station. One achieves hereby that the waggons are returned to the loading station in inverted position so that water, and snow in particular, cannot enter the empty goods container.

Figure 2:
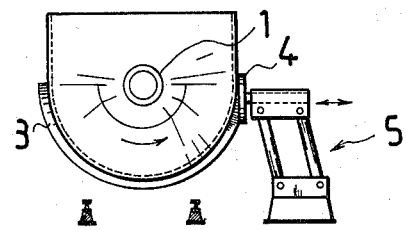
Figure 3:
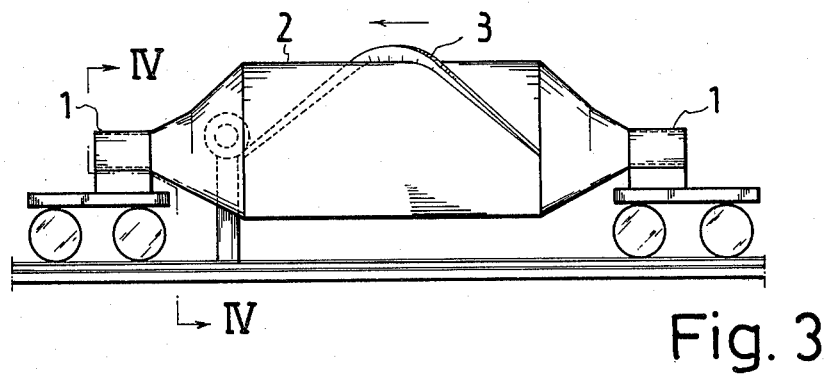
Figure 4:
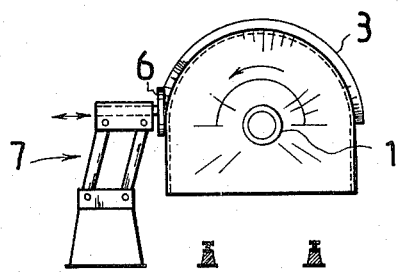

In the following the invention is described in detail with reference to the drawings, wherein:

FIG. 1 presents in elevational view a goods waggon arriving at the unloading station and the unloading mechanism cooperating therewith, FIG. 2 shows the cross section in the direction of line II—II in FIG. 1, FIG. 3 presents likewise in elevational view a goods waggon at the unloading station in its unloaded position, and FIG. 4 shows the cross section along line IV—IV in FIG. 3.

As shown in FIGS. 1 and 2, the goods waggon comprises a goods container 2 mounted at both ends with a bearing 1 on a bogie, this goods container being cylindrically shaped in its bottom part. To the cylindrical part has been affixed a helically shaped guide 3, starting in the horizontal plane passing through the axis of the cylindrical part and arching on the underside 180° around the cylindrical part thus terminating on the other side of the cylindrical part in the same plane with the initial end. The guide 3 constitutes one of the two components of the mechanism according to the invention.

The other part of the unloading mechanism consists of a first roller 4 stationarily mounted on one side of the travelling path at the initial end of the unloading station (FIG. 2), this roller being rotatably held by a supporting means 5, which has been represented schematically as a linkage mechanism in FIG. 2, but may in practice equally be carried out by a system based on pneumatics or hydraulics and by which the roller 4 may be displaced to and fro in the direction transversely to the track.

At the ultimate end of the unloading station (FIG. 3) is found a second similar supporting means 7 fitted with a roller 6 and operating on the opposite side of the transport track (FIG. 4), but which has been placed on a higher level than the supporting means 5.

The goods waggon unloading mechanism of the invention operates as follows. As the waggon that shall be unloaded arrives at the unloading station (situation of FIG. 1), the underside of the guide 3 encircling the cylindrical part of the goods container 2 comes into contact with the roller 4 and remains in contact while the waggon is moved slowly forward. After passage over the unloading funnel located under the track, this roller 4 at the initial end of the unloading station has forced the goods container to turn through 180° about its longitudinal axis, that is, upside down into the position shown in FIG. 4.

For turning the goods container 2 once again into its transport position, the waggon is moved further, past the roller 6 located at the ultimate end of the unloading station, which meets on the opposite side of the cylindrical part the guide 3 on its upper side, and this causes, as the waggon moves forward, turning of the goods container still another 180° about its longitudinal axis.

The rollers 4 and 6 of the unloading mechanism have been preferably disposed with a distance between them such which is slightly more than the length of the goods container 2, whereby then the goods unloading and the turning of the goods container into its transport position take place at different times. It is possible by omitting at the ultimate end of the unloading station the roller 6, to return the waggons to the loading station in upside down position, whereby the advantage is gained that water, and snow in particular, cannot enter the empty goods container 2.

To invert a full goods container (load: 68 tons) the engine needs about 10 tons (0.10 MN) traction, and the returning of the emptied waggon into its initial position requires a force about 1 ton (10 kN). Assuming that the train is composed of 20 waggons, this waggon sequence of 270 m length can be emptied in half an hour, which implies a remarkable saving of time compared with unloading methods of prior art.

The invention is not confined to the embodiment presented in the disclosure and drawings, and it may be modified within the scope of the claims attached. The invention is not necessarily associated with a railway waggon, as has been shown in the drawings: it may also be applied in the case of a car travelling on the highway, such as a lorry trailer for instance.

I claim:

1. An unloading mechanism for a goods waggon having a goods container cylindrically shaped at its bottom and having a longitudinally extending cylinder axis and rotatably carried at its ends in bearings on bogies for rotation about said longitudinal axis, said unloading mechanism comprising an arcuate guide affixed to the goods container and extending on the underside around the cylindrical bottom thereof in a helical configuration from one end to the other so that its initial and ultimate ends are located in a horizontal plane passing through said longitudinal axis of the cylindrical container, and first and second rollers engageable with said guide, the first roller being rotatably carried on supporting means disposed on one side of a travelling path of said waggon at the initial end of an unloading station, whereby as the waggon is moved to the unloading station, said first roller comes into contact with the underside of the guide forcing, as the waggon continues to move forward, the goods container to turn in its bogie bearings through 180° about its said longitudinal axis into an inverted position, and said second roller being rotatably carried on further supporting means which is at a higher level than the supporting means carrying the first roller and is disposed on the opposite side of said travelling path of said waggon, whereby said second roller can come into contact with the upper side of the guide forcing the goods container to turn another 180° about its said longitudinal axis to return it to a transport position.

2. Unloading mechanism according to claim 1, characterized in that the rollers are located immediately at both ends of the unloading station.

3. Unloading mechanism according to claim 1, characterized in that the second roller is located immmediately before a loading station.

* * * * *